STANLEY L. JUDKINS
LEROY D. WRIGHT
INVENTORS

BY [signature]
ATTORNEY

STANLEY L. JUDKINS
LEROY D. WRIGHT
INVENTORS

BY [signature]
ATTORNEY

Nov. 20, 1956 L. D. WRIGHT ET AL 2,771,600

UNIVERSAL STATION IDENTIFICATION SIGNAL KEYER FOR USE IN GROUNDED AVIATION TRAINERS

Filed July 22, 1953 5 Sheets-Sheet 3

STANLEY L. JUDKINS
LEROY D. WRIGHT
INVENTORS

BY Donald V. Hillier

ATTORNEY

STANLEY L. JUDKINS
LEROY D. WRIGHT
INVENTORS

BY [signature]
ATTORNEY

STANLEY L. JUDKINS
LEROY D. WRIGHT
INVENTORS

BY [signature]
ATTORNEY

United States Patent Office 2,771,600

Patented Nov. 20, 1956

2,771,600

UNIVERSAL STATION IDENTIFICATION SIGNAL KEYER FOR USE IN GROUNDED AVIATION TRAINERS

Leroy D. Wright, Whitney Point, and Stanley L. Judkins, Binghamton, N. Y., assignors to Link Aviation, Inc., Binghamton, N. Y., a corporation of New York Application July 22, 1953, Serial No. 369,577

23 Claims. (Cl. 340—365)

This invention relates to universal station identification keying means for use in conjunction with grounded aviation trainers and simulators, and, more specifically, the invention relates to means, which, upon actuation of a switch, operates to key a signal source in such a manner as to transmit a plurality of dots and dashes.

In such trainers and simulators apparatus is provided whereby simulated radio signals, both aural and visual, are presented to the student in the trainer, which signals duplicate those that a pilot in a real plane would have presented to him if the plane were actually flying the course relative to a real radio station that it is assumed the student in the trainer is flying. Such signals may simulate the long-used A–N signals of a low frequency radio range, the visual signals of an omni-directional range, etc.

Whether such signals are aural or visual, most radio stations intermittently transmit station-identification signals which are aurally presented to the pilot by earphones connected to a radio receiver tuned to the station. Such station identification signals are transmitted in Morse code and each radio transmitter of the type being considered has a different set of call or station identification letters.

The apparatus of this invention provides program control means whereby the instructor in charge of training the student in the trainer may select any desired combination of station identification letters by the simple expedient of setting a knob for each letter of the station identification series. Relay means in the apparatus then translate the selected combination of identification characters into the dot and dash signals corresponding to the representation of these characters in Morse code.

In order that the detailed nature of the invention may be clearly understood, reference is made to the accompanying drawings, wherein Figs. 1 and 2 show graphically the energization and deenergization of the control relays throughout the entire station identification signal transmission cycle.

Figure 1:
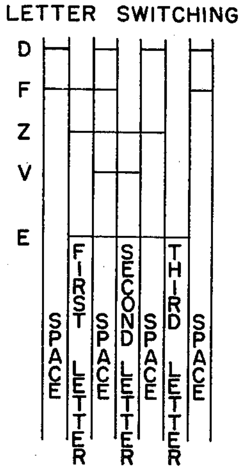

Radio stations are usually identified by the transmission of three International Morse letters. For example, Binghamton is BGM, Elmira is ELM. Radio range stations send out identification signals in a fixed amount of time. For purposes of the patent application a set of Morse letters which identify a station may be termed the "message." Hence a message may be composed of three "letters." Each letter is composed of a series of "characters," a character being either a dot or a dash. In the transmission of International Morse characters by automatic means such as are used on actual radio ranges, the period of time used for a dot is usually made to be one third the amount of time used for a dash, and the period of time allotted to the space between dots and dashes of a letter is equal to the period of one dot. The amount of time for a space between two letters is equal to the period of a dash.

For a station identification of a maximum of three letters, a separate multi-layer selector switch is provided for each of the three letters, so that each selector switch may be set to any letter of the alphabet required to make up the desired station identification. Accordingly, each selector switch is provided with twenty-six positions, one for each letter of the alphabet, and a control knob by means of which the switch may be set for any desired letter. Thus the first, second and third letters of the desired station identification may be set up by setting each of the three control knobs to the required letter.

Since, in the international Morse code, no letter of the alphabet requires a total of more than four characters (dots and dashes), for use with this code each selector switch is provided with four layers, e. g., wafers or the like, each layer having twenty-six fixed contacts for permanent connections representative of the sequence of dots and dashes in the code for each letter of the alphabet. A fifth wafer or the like is provided for permanent connections representative of the relative length of time required for the transmission of each letter of the alphabet, useful when it is desired to adjust the time of transmission of a station identification to fit into a given interval of time irrespective of the relative transmission time of the individual letters of which the station identification is composed.

Each selector switch is provided with five sliding contactors or conductors movable simultaneously by means of a single knob, each such conductor being movable over the twenty-six fixed contacts of one wafer. The five sliding contactors are insulated from one another and each is contacted by another sliding contactor attached to the frame of the switch and provided with a separate fixed output terminal through which the respective wafer may be electrically scanned by proper scanning means, to determine whether the wafer is connected to represent a dot or a dash.

A first set of sequentially operable relays is provided for letter switching, i. e., for contacting the three selector switches in the proper order and to provide letter spaces between the respective letters of the station identification. A second set of sequentially operable relays is provided for character scanning, i. e., for contacting the four character-representing wafers of a given selector switch in the proper order and to provide spaces between the characters making up a letter.

A bi-stable switching system is provided to operate the two sets of sequentially operable relays and to key a signal emitter, alternately scanning a wafer to cause the emitter to transmit a dot or dash as the code requires, and providing spaces either between letters or between characters in the same letter.

The time duration of dots, dashes and spaces is shown as determined in terms of relative voltages which are measured by means of voltage integrating means and coincidence circuits. Provision is also made for adjusting the absolute unit time interval by the simple expedient of adjusting a voltage, and for automatically varying the unit time interval according to permanent connections incorporated in the fifth wafer of each of the selector switches.

Briefly described, the automatic code keying apparatus comprises a selector switch for each letter to be transmitted, the positioning of which serves to distribute certain potentials upon the selector conductors of the switch in accordance with characters (dots and dashes) of the selected letter. Scanning relays scan the selector conductors, sequentially connecting them to a pulse generating device which derives a gating pulse in accordance with the above-mentioned potential distribution. The gating pulse connects a conventional oscillator to an output circuit. The transmission of scanning the various characters of the letters is accomplished by the energization and deenergization in proper sequential relation of a plurality of relays, the sequential operation of which is graphically shown in Figs. 1 and 2. In Fig. 1 it will be seen that the letter switching relays are designated D, F, Z, V and E. At the end of the transmission of a given letter, as shown in Fig. 1, relays D and F are energized and remain energized until the commencement of the transmission of the characters of the first letter. At that instant relay D becomes deenergized and relays Z and E become energized, relay F remaining energized until the commencement of the transmission of the second letter. At the end of the transmission of the first letter, relay D becomes energized again, relays F, Z and E remain energized, and relay V becomes energized. At the start of the transmission of the characters of the second letter, relays D and F become deenergized, while relays Z, V and E remain energized, etc. Thus, the relays D, F, Z, V and E operate only at the beginning or end of the transmission of a letter.

Figure 2:
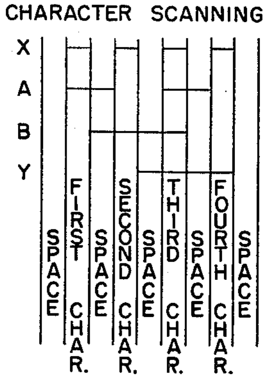

In Fig. 2, the character scanning relays X, A, B, and Y operate at the beginning and end of the various characters which form a letter. Thus, at the beginning of the first character of any letter, relays X and A become energized; at the end of the transmission of the first character relay X becomes deenergized and relay B becomes energized. At the beginning of the transmission of the second character relay X again becomes energized, relay A becomes deenergized, and relay B remaines energized, etc.

Consequently, by referring to Figs. 1 and 2, the state of any relay at any selected point in the transmission of a set of station identification signals may be ascertained.

Figures 3, 4:
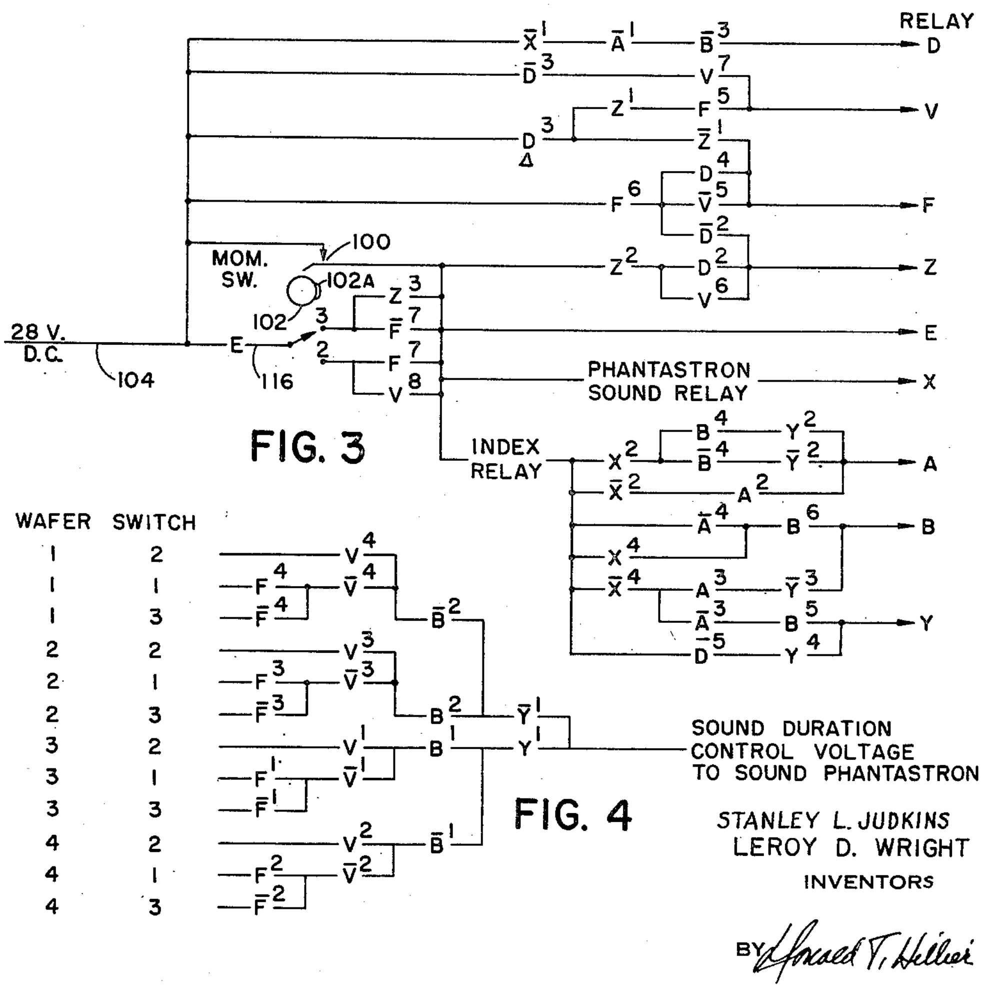
Figs. 3 and 4 are simplified schematics of the circuits which control the relays of the invention.

To further assist in the understanding of the invention, reference is made to Fig. 3 wherein the conditions precedent to the energization of any particular relay may be ascertained by inspection. In Fig. 3 the relays to be energized are shown at the right, and the various contacts of the various relays through which a circuit may be made to energize the relays at the right are shown between the conductor 104 and the relays on the right. Figures 3 and 4 employ the convention that a dash or bar over a relay contact number indicates that the contact is normally closed, while the absence of such a dash or bar indicates that the contact is normally open. "Normally closed" and "normally open" refer to the states of the contacts when the apparatus is completely disconnected from any electrical source of power. Thus, relay D will be energized when relays X, A and B are all deenergized, the circuit being through the NC contact 1 of relay X, the NC contact 1 of relay A and the NC contact 3 of relay B, the horizontal line above relay X and the numeral "1" above the horizontal line indicating that the circuit is closed through the NC contact 1 of relay X when relay X is deenergized. Similarly, relay V is energized when relay D is energized, relay Z is energized and relay F is energized, its circuit being through the NO contact 3 of relay D, NO contact 1 of relay Z and NO contact 5 of relay F, the delta associated with the designation "D" for relay D indicating that the contact 3 of relay D is of the make-before-break type. Also, when relay V is energized, a hold circuit is made for relay V through its own NO contact 7 and NC contact 3 of relay D providing relay D is deenergized.

Considering also Fig. 4, it will be seen that scanning relays F, V, B and Y determine which of the four wafers of any one of the three selector switches is connected to the sound duration control of the sound phantastron. For example, the first character of any series of station identification signals is from the first wafer of the first selector switch, and it will be seen that the said wafer is connected to the said control when relay F is energized and relays B, V and Y are deenergized, the circuit being through the NO contact 4 of relay F, NC contact 4 of relay V, NC contact 2 of relay B, and NC contact 1 of relay Y. Referring to Fig. 1 it will be noted that during the entire transmission of the first letter, relay F is energized and relay V is deenergized, and referring to Fig. 2 it will be seen that while the first character of any letter is being transmitted relays B and Y are deenergized. Hence it may be seen that the relays comprise a scanning means operable to connect sequentially each of the four wafers of each selector switch. As will be exemplified below, the conductor leading from each of the four wafers of each selector switch will carry a potential having an amplitude commensurate with the time duration of the characters of the letter selected by the position of the selector switch; or, a conductor may be connected to ground potential, which serves as an indexing signal to advance the scanning means from the wafer conductors of one selector switch to the first wafer of the following selector switch.

Figure 5:
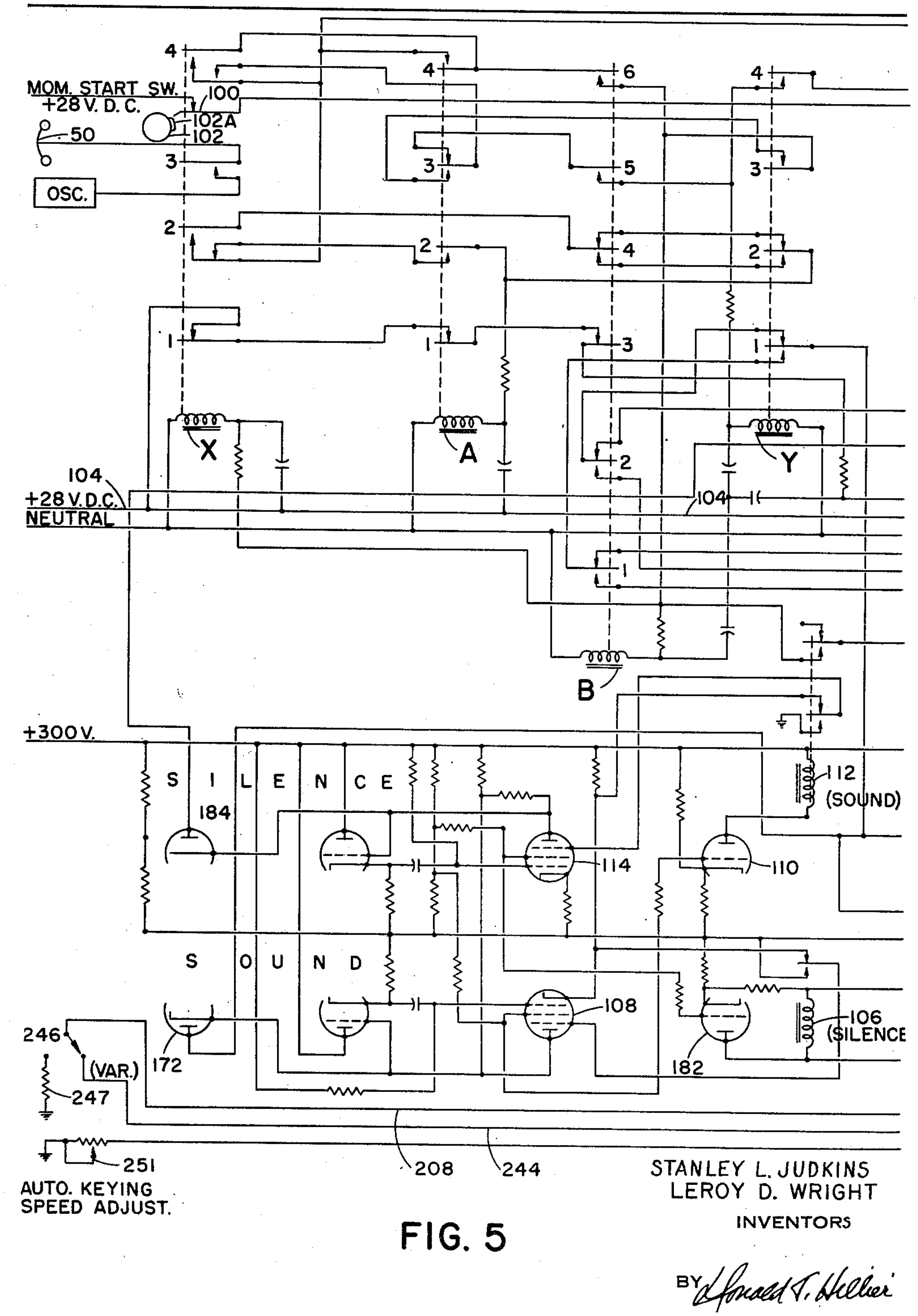
Figs. 5 to 8 are wiring diagrams of the apparatus of the invention.

Assuming the apparatus has completed the transmission of a series of station identification signals and a time interval of non-identification transmission is ensuing, the momentary start switch 100 (Fig. 5) under the control of cam 102 is open. As shown in Fig. 1, when the last letter has been transmitted, switching relays D and F are energized and relays Z and V and the start-stop relay E are deenergized. As shown in Fig. 3, 28 v. D. C. is routed from conductor 104 through the NC contacts 1, 1, and 3 of deenergized relays X, A and B respectively, to the coil of relay D, energizing the same. Upon the energization of relay D, 28 v. D. C. is routed from conductor 104 through the NO contacts 3 of relay D, and the NC contact 1 of relay Z to the coil of relay F, energizing relay F. The energizing of relay F routes 28 v. D. C. from conductor 104 through the NO contacts 6 of relay F and the NC contact 5 of deenergized relay V to relay F to hold the same energized through a first holding circuit, and also the energizing of relay F routes 28 v. D. C. through the NO contacts 6 of relay F and the NO contacts 4 of energized relay D to relay F to hold relay F energized through a second holding circuit. At the same time the scanning relays X, A, B and Y are all deenergized because with the switch 100 open and relay E deenergized, relays X, A, B, Y, V and Z are deenergized.

When the momentary start switch 100 is closed by the lobe 102*a* on cam 102, which closing occurs at the instant the transmission of station identification signals starts, the relays assume the condition shown in Figs. 1 and 2. 28 v. D. C. is routed through the switch to the start-stop relay E, energizing the same. Energization of relay E opens its NC contacts 1 (Fig. 6), breaking the ground circuit to the silence relay 106 (Fig. 5), deenergizing the same, which action transfers the suppressor grid of the sound phantastron 108 (Fig. 5) from ground to the cathode of phantastron 108 through the shift in the contacts controlled by relay 106 and initiating the timing action of the sound phantastron. The screen voltage of the phantastron is instantly increased and tube 110 conducts, energizing the sound relay 112, and routing 28 v. D. C. from momentary break switch 100 through the NO contact 2 of relay 112 to the keying relay X, energizing the same, which action closes the NO contact 3 of relay X connecting the oscillator to the earphones 50. Consequently, the earphones emit the tone generated by the oscillator. The energization of sound relay 112 also closes its NO contact 1, grounding the suppressor grid of the silence phantastron 114 and preventing it from becoming operative.

The energization of keying relay X opens its NC contact 1 breaking the circuit to relay D deenergizing the same and routing 28 v. D. C. through the NO contact 6 of energized relay F and the NC contact 2 of relay D to relay Z energizing the same.

Relay E remains energized for the entire duration of the transmission of the station identification signals. When the relay becomes energized, if the recycle switch 116 is in its lower position, when relay E becomes energized 28 v. D. C. is routed from conductor 104 through the NO contact 2 of relay E, switch 116 and the NO contact 7 of energized relay F to relay E to hold the relay energized. When switch 116 is in the upper position and relay E is energized, 28 v. D. C. is routed through switch 116 and the NO contact 3 of the energized relay Z to the relay E to hold the same energized. The subsequent opening of the momentary switch 100 therefore does not deenergize relay E. Switch 116 is in the upper and lower positions when the station identification signals consist of three and two letters, respectively.

All of the foregoing relay and other operation takes place within a few milli-seconds of the closing of the momentary switch 100.

Figure 7:
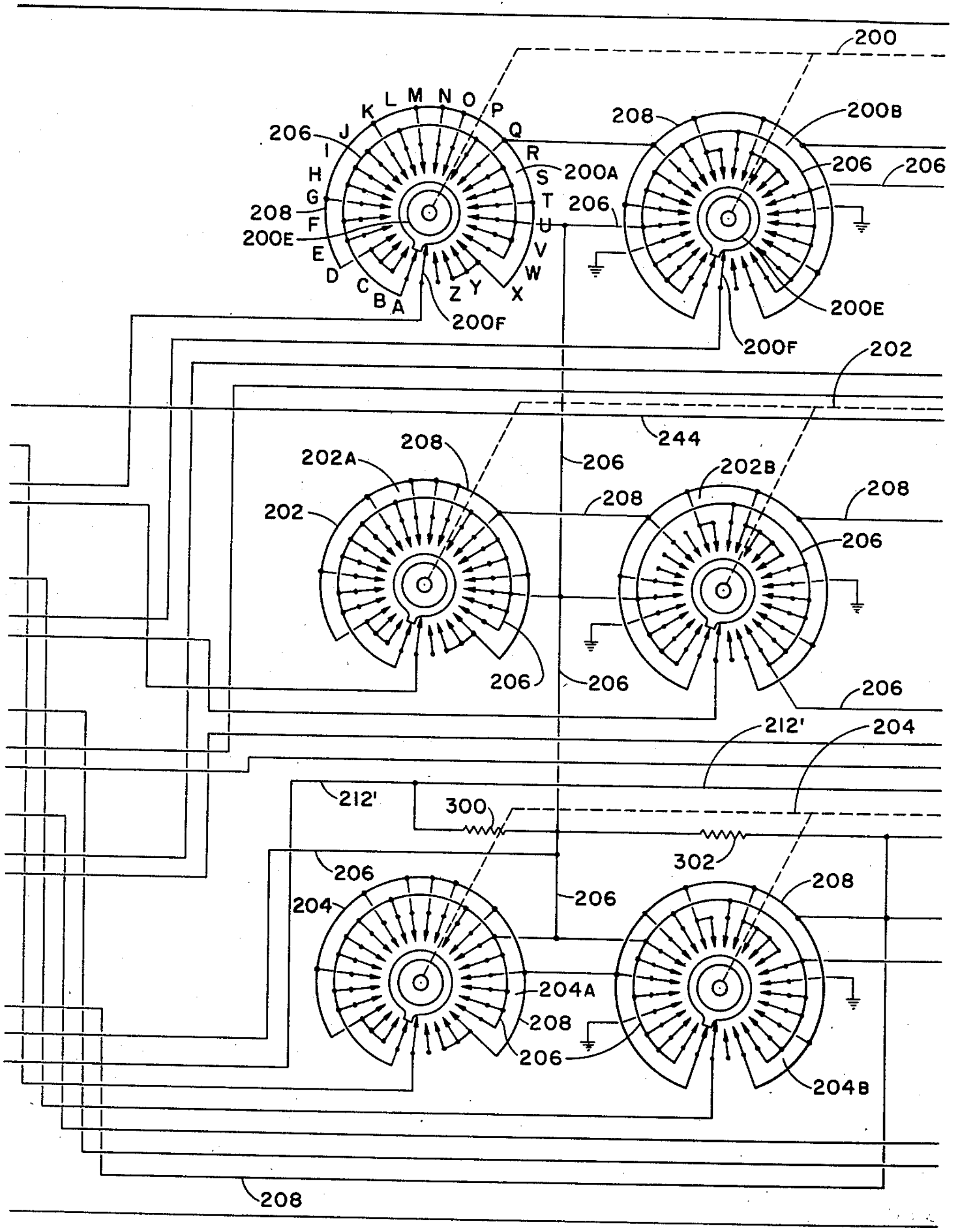
Figure 8:
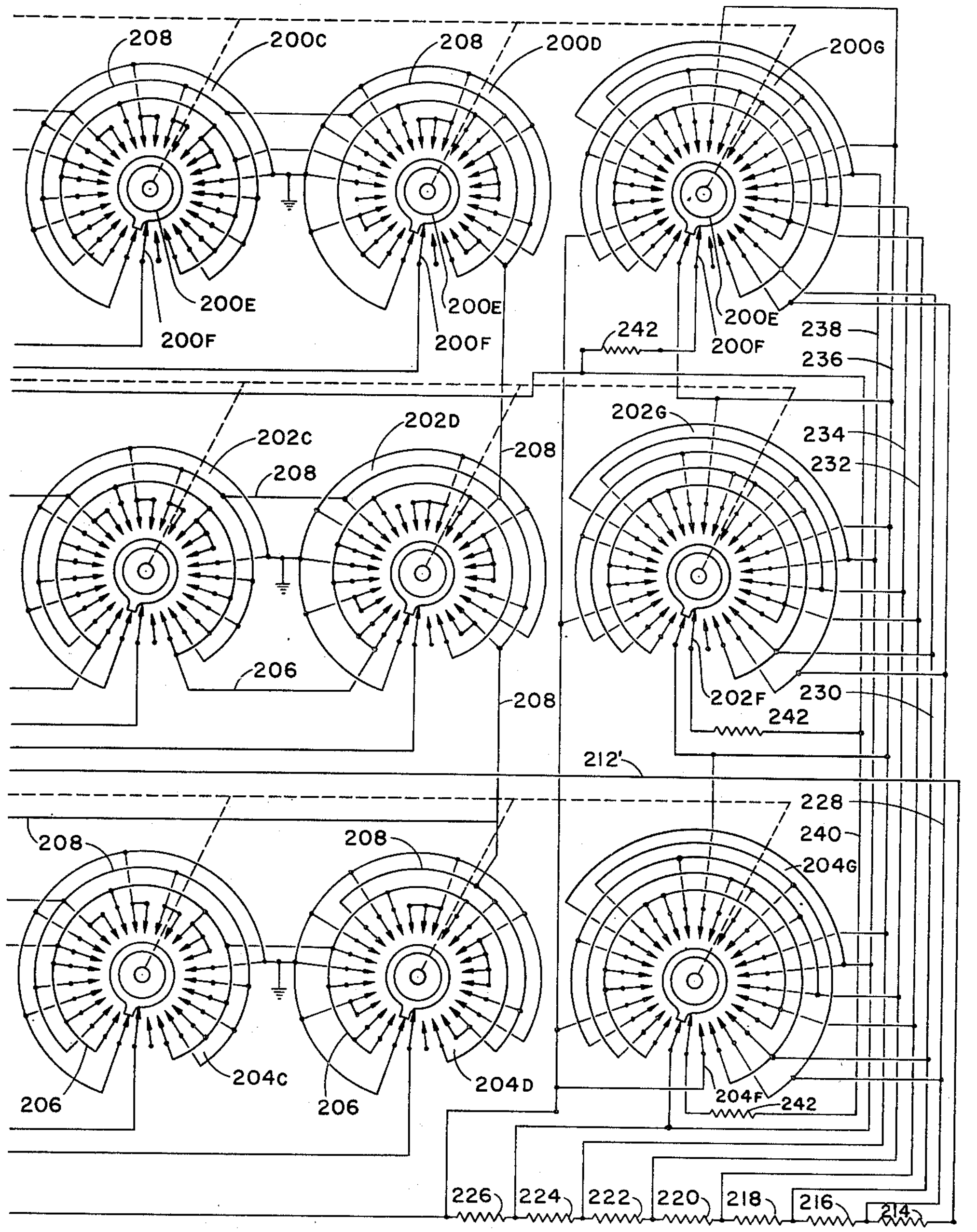
Figure 9:
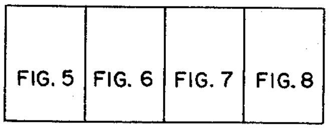
Fig. 9 shows how Figs. 5, 6, 7, and 8 may be combined to produce a composite wiring diagram.

Referring to Figs. 7 and 8, the three selector switches for the first, second and third letters of the station identification signals are designated 200, 202, and 204. The four wafers 200*a*, 200*b*, 200*c*, and 200*d* of switch 200 are respectively for the first, second, third, and fourth characters of the first letter and the fifth wafer 200*g* is for regulating the length of the dots and dashes. The wafer 200*a* has a terminal for each letter of the alphabet, and if the first character of the letter is a dot the terminal is connected to the conductor 206 which, as will be explained, carries the dot voltage. If the first character of the letter is a dash the terminal is connected to the conductor 208 which, as will be explained, carries the dash voltage. Similarly, wafer 200*b* has a terminal for each letter of the alphabet, which terminal is connected to dot conductor 206 or dash conductor 208 depending on whether the second character of the first letter is a dot or a dash. The terminals for the letters E and T of wafer 200*b* are, however, grounded, since the letters E and T have no second character. The various terminals of the third and fourth wafers 200*c* and 200*d* are similarly conected to the dot conductor 206, dash conductor 208 or grounded depending upon whether the third and fourth characters of the first letter are respectively a dot, a dash or not employed. Switch 200 is set by the instructor to select the first letter of the station identification signals to be transmitted and thereby positions the four wipers 200*e* so that they respectively engage the selected letter contact of the wafer with which they are associated. Each of the wafers 200*e* is engaged by a brush 200*f*. Switches 202 and 204 which select the second and third letters of the station identification signals are identical with switch 200 and need not be described in detail.

Figure 6:
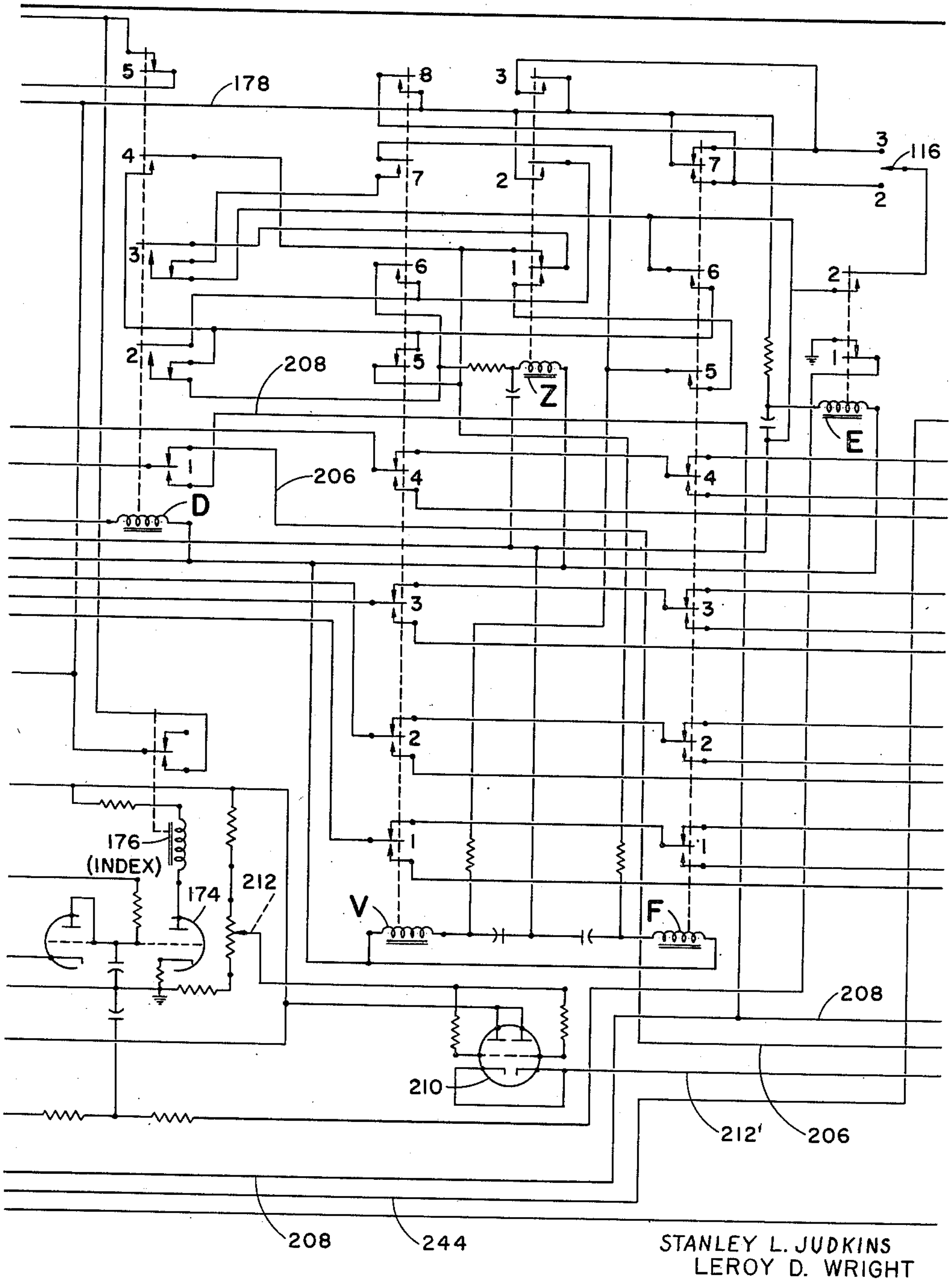

The dot and dash voltages are derived as follows: 300 v. D. C. is applied to the plates of cathode follower 210 (Fig. 6). Potentiometer 212 is adjusted to provide a voltage at the cathode exactly equal to the maximum or peak plate voltage of the sound and silence phantastrons 108 and 114. The voltage from cathode follower 210 is routed along conductor 212′ to the series resistors 214, 216, 218, 220, 222, 224, and 226. Each of the selector switches 200, 202, and 204 is provided with a fifth wafer 200*g*, 202*g* or 204*g*, each having a contact for each letter of the alphabet.

All of the twenty-six contacts of wafer 200*g* are connected to one of the conductors 228, 230, 232, 234, 236 or 238. These conductors are respectively connected to the terminals of wafer 200*g* and to the voltage divider comprising resistors 214, 216, 218, 220, 222, 224, and 226 according to the relative length of time required to transmit the characters of the letter represented by each of the terminals. The same arrangement prevails with respect to the fifth wafers 202*g* and 204*g* of the second and third letter selector switches 202 and 204. One of the conductors 228, 230, 232, 234, 236 or 238 routes a voltage proportional to the time interval required for the transmission of each selected letter to the terminal selected by switch 200 of the three fifth wafers 200*g*, 202*g*, and 204*g*, which voltage is taken off by the wiper 200*f*, 202*f* or 204*f* and routed through one of the three equivalue summing network resistors 242 and along conductor 244 to the variable terminal of the selector switch 246. The voltage so routed is proportional to the average of the three voltages selected by wipers 200*f*, 202*f*, and 204*f*, and therefore proportional to the time duration required to transmit the three letters for which the switches 200, 202 and 204 are set. Assuming switch 246 to be on the variable terminal, the voltage is routed along conductor 208 to the selector switch 200 as well as to the corresponding dash conductors of switches 202 and 204 so that wipers 200*f* of wafers 200*a*, 200*b*, 200*c* and 200*d* will be connected to the dash voltage when the control 200 is set so that the respective wafers are in the dash position.

The voltage on conductor 208, by virtue of the voltage divider comprising resistors 214—226 and the summing resistors 242, is negative with respect to the voltage on conductor 212 by an amount proportional to the required time duration of a dash character. The voltage divider comprised of resistors 300 and 302 provide a potential on conductor 206 which is negative with respect to conductor 212 by an amount equal to one-third that with which conductor 208 is negative with respect to conductor 212. This provides a voltage on conductor 206 proportional to the required time duration of a dot character. The dot voltage is picked off from conductor 206 by the switch wafers according to the settings of the switches 200, 202 and 204. Hence voltages commensurate with the time duration of the various characters of a selected call letter appear on the wiper or selector conductors of the selector switch, and as exemplified below, these voltages will be scanned and sequentially applied to pulse generating means, which will provide a gating signal having a time duration commensurate with the amplitude of the voltage on the wafer conductor being scanned.

Switch 246 (Fig. 5) is set in the variable position when the type of station being simulated allots a fixed time interval for the transmission of the station identification signals, regardless of the number of characters (dots and dashes) in the identification signals.

In cases where the station being simulated has fixed length dots and dashes in its identification signals, switch 246 is placed in its left position and is connected to ground through resistor 247. A fixed dash voltage is thus supplied to conductor 208 and a fixed dot voltage is supplied to conductor 206.

The automatic keying speed adjustment potentiometer 251 is set to adjust the voltage at the end of resistor 226 so that the transmission of a complete set of station identification signals requires the same length of time as the type of station being simulated.

Assuming the momentary break switch 100 to have just closed and the immediately ensuing relay and other operation above described to have taken place, the selected contact on the first wafer 200*a* of the first selector switch 200 is connected from wiper 200*f* through the NO contact 4 of energized relay F, and the NC contact 4 of deenergized relay V, the NC contact 2 of deenergized relay B and the NC contact 1 of deenergized relay Y to the plate of the sound phantastron control tube 172 as well as to the grid of the index relay control tube 174 which controls the index relay 176. The voltage so applied from the contact induces operation of tube 174 energizing index relay 176 and routing 28 v. D. C. from conductor 178 through the NO contact of energized relay 176, the NO contact 2 of relay X, the NC contact 4 of relay B and the NC contact 2 of relay Y to relay A, energizing the same.

As soon as the phantastron 108 starts to operate upon the closing of the momentary switch 100, its plate voltage goes negative linearly with respect to time until its level is equal to the voltage applied to the plate of control tube 172, which voltage is of a selected level in the event the selected contact of wafer 200a is a dot contact and is of a lower level in the event the selected contact is a dash contact. When the voltage on the plate of phantastron 108 is equal to the voltage from the selected contact, the voltage on the screen grid of the phantastron reverts to its stable condition, shutting off tube 110, deenergizing sound relay 112, and starting the operation of silence phantastron 114 by transferring the suppressor grid thereof from ground to its cathode. The deenergization of sound relay 112 breaks the 28 v. D. C. circuit to keying relay X, disconnecting the earphones from the oscillator and ending the sounding of the first character of the first station identification letter. As the phantastron 108 integrates a constant voltage with respect to time, sound relay 112 will energize keying relay X, gating the output of the oscillator to the output circuit to which the earphones may be connected. Since the phantastron stops integrating when its plate voltage reaches the voltage applied to control tube 172 from the wafer conductor being scanned, it may be seen that control tube 172 and its associated circuitry act as a coincidence circuit.

The sound phantastron operates a predetermined length of time equal to the duration of a dot in the event the selected contact of wafer 200a is a dot contact and three times as long when the selected contact is a dash contact.

Upon the deenergization of relay X at the termination of the dot or dash representing the first character of the first letter of the station identification signals, 28 v. D. C. is routed from conductor 178 through the NO contact of index relay 176, the make-before-break contact 2 of relay X and NO contact 2 of relay A to hold relay A energized. Relay B is energized by the routing of 28 v. D. C. from conductor 178 through the NO contact of index relay 176, the NC contact 4 of relay X, NO contact 3 of relay A and the NC contact 3 of relay Y. The contact of the second wafer 200b of the first letter selector switch 200 is then connected through NO contact 3 of relay F, NC contact 3 of relay V, NO contact 2 of relay B and the NC contact 1 of relay Y to the grid of index relay control tube 174 and to the plate of sound phantastron control tube 172.

Upon the transfer of the suppressor grid of the silence phantastron 114 from ground to cathode by the deenergization of sound relay 112 upon the cessation of operation of the sound phantastron 108, the screen voltage of the silence phantastron 114 increases causing tube 182 to conduct and energize the silence relay 106. The energization of silence relay 106 transfers the suppressor grid of phantastron 108 from cathode to ground, rendering sound phantastron 108 inoperative. Hence it may be seen that the sound relay and silence relay circuits operate as a bi-stable switching means, since only one is operatively connected at one instant, and since the energization of one relay automatically de-energizes the other.

A voltage having a level corresponding to a dot is routed from conductor 206 through the NC contact 1 of spacing relay D to the plate of silence phantastron control tube 184. The silence phantastron 114 continues to operate until the voltage on the plate thereof drops to the level of the voltage applied to the control diode 184, which time interval is equal to the duration of a dot, at which instant the voltage on the control grid thereof shuts off tube 182, deenergizing silence relay 106, which renders sound phantastron 108 operative resulting in the energization of sound relay 112, energizing relay X, and connecting the oscillator to the earphones as previously explained. Upon energization of relay X a first hold circuit for relay B is made through the make-before-break contact 4 of relay X and through the NO contact 6 of relay B.

The change of relay X to the energized state deenergizes relay A and makes a second hold circuit for relay B through the NC contact 4 of relay A and the NO contact 6 of relay B. Also, the energization of relay B disconnects the first wafer 200a of the first letter selector switch 200 from the grid of index relay control tube 174 and from the plate of phantastron control tube 172 and connects the selected contact of the second wafer 200b of the first letter switch 200 to the elements of tube 174 and 172 through the NO contact 3 of relay F, NC contact 3 of relay V, NO contact 2 of relay B and NC contact 1 of relay Y. The sound phantastron operates as previously described for a length of time according to whether the voltage applied from the selected contact is a dot or dash voltage, during which interval the earphones are connected to the oscillator and emit a dot or a dash. At the end of the period of sounding of the dot or dash forming the second character of the first letter, as previously explained the sound relay 112 is deenergized and the silence relay 106 is energized, deenergizing relay X and disconnecting the earphones from the oscillator. Relay Y is energized by routing 28 v. D. C. from conductor 178 through the NO contact of index relay 176, the make-before-break NC contact 4 of relay X, NC contact 3 of relay A and the NO contact 5 of relay B to relay Y. The energization of relay Y closes a hold circuit therefor through the index relay 176, NC contact 5 of relay D and NO contact 4 of relay Y.

Upon the termination of the transmission of the sound forming the second character of the first letter, a voltage having a level corresponding to the duration of a dot is routed from conductor 206 through the NC contact 1 of spacing relay D to the plate of silence phantastron control tube 184 to operate silence phantastron for the duration of a dot. At the end of the silence period following the transmission of the second character, silence relay 106 is deenergized as before and sound relay 112 is energized, starting the operation of the sound phantastron 108 and energizing relay X to connect the earphones to the oscillator for the transmission of the third character of the first letter. Upon the energization of relay X, relay A is again energized through the contacts of index relay 176, NO contact 2 of relay X, NO contact 4 of relay B and NO contact 2 of relay Y.

Upon the energization of relay Y at the termination of the transmission of the second character of the first letter, the selected contact of the third wafer 200c of the first letter selector switch 200 is connected through the NO contact 1 of relay F, NC contact 1 of relay V, NO contact 1 of relay B and the NO contact 1 of relay Y to the index relay control tube 174 and the plate of sound phantastron control diode 172. Sound phantastron 108 operates for a length of time corresponding to a dot or dash depending upon whether the selected contact of the third wafer is a dot or dash.

At the end of the third dot or dash the sound and silence phantastrons and relays operate as before described, deenergizing relay X and relay B is deenergized since relay Y is energized, relay X is deenergized and relay O is energized. A period of silence ensues as previously described, at the termination of which relay X is again energized and relay A is deenergized since relay X is energized, relay B is deenergized and relay Y is energized.

The deenergization of relay B at the end of the third dot or dash disconnects the selected contact of the third wafer 200c of the first letter selector switch 200 from tubes 174 and 172 and connects the fourth wafer 200d of the switch to the said tubes through the NO contact 2 of relay F, NC contact 2 of relay V, NC contact 1 of relay B, and NO contact 1 of relay Y. Since relay X is energized, the earphones are connected to the oscillator to sound the fourth character of the selected first letter for the length of a dot or dash, depending upon whether the selected contact is a dot or dash.

At the termination of said sounding, relay X becomes deenergized as before described and relay D becomes energized since relays X, A and B are all deenergized. Relay Y becomes deenergized upon the energization of relay D since relay B is also deenergized. Consequently, at the termination of the transmission of the fourth character of the first letter, relays X, A, B and Y are all deenergized. Relay F remains energized through its own NO contact 6 and the NC contact 5 of relay V, and upon energization of relay D a second hold circuit for relay F is established through its own NO contact 6 and the NO contact 4 of relay D. Relay Z remains energized because the make-before-break contacts 2 of relay D establish a hold circuit therefor through the NO contact 2 of relay Z. Relay V becomes energized by the circuit through the NO contact 3 of relay D, NO contact 1 of relay Z and NO contact 5 of relay F. Relay E remains energized, since if switch 116 is in the 3-letter position relay Z is energized and if switch 116 is in the 2-letter position relay F is energized.

The energization of relay D routes a dash voltage from conductor 208 through NO contact 1 of relay D to the plate of silence phantastron control tube 184. Silence phantastron 114 operates until the voltage on its plate is equal to the voltage on the plate of tube 184, which period of time is equal to the length of a dash. The operation of the silence and sound relays 106 and 112 is as before described, and at the end of the silence period equal to the duration of a dash, the sound and silence relays operate as described, energizing relay X and connecting the earphones to the oscillator. Consequently, following the sounding of the fourth character of the first letter, a letter space period of silence of a duration equal to the time interval of a dash ensues. The energization of relay X deenergizes relay D and relay F is deenergized because relay V is energized. Relay Z remains energized through the NO contact 2 of relay Z and the NO contact 6 of relay V. Relay E remains energized because if switch 116 is in the 3-letter position relay Z is energized routing 28 v. D. C. through its NO contact 3 to relay E and if switch 116 is in the 2-letter position 28 v. D. C. is routed through NO contact 8 of relay V to relay E. Relay A is energized upon the energization of relay X by routing 28 v. D. C. through the NO contact 2 of relay X, NC contact 4 of relay B and NC contact 2 of relay Y.

Under the foregoing conditions of relay V energized, relay B deenergized and relay Y deenergized, the selected contact of the first character wafer 202*a* of selector switch 202 which is used to select the second letter of the station identification signals is connected through the NO contact 4 of relay V, the NC contact 2 of relay B and the NC contact 1 of relay Y to the grid of index relay control tube 174 and the plate of phantastron control tube 172. Consequently, the sound phantastron 108 operates for a length of time equal to a dot or a dash depending upon whether the first character of the second letter is a dot or a dash.

Consequently, when the transmission of the first character of the second letter commences, relays X, A, B, Y, D, E and Z are in the same state as upon the beginning of the transmission of the first character of the first letter. At the beginning of the transmission of the first character of the first letter, relays F and V were respectively energized and deenergized while at the beginning of the transmission of the first character of the second letter they are respectively deenergized and energized. Referring to Fig. 4, the condition of relays F and V being respectively energized and deenergized connected the four wafers of the first letter switch 200 to the four contacts of relay B during the transmission of the four characters of the first letter, relays B and Y being initially both deenergized to first select the first wafer 200*a* of switch 200, relay B then being energized to next select the second wafer 200*b* of switch 200, relay Y then being energized to select the third wafer 200*c* of switch 200, and relay B then being deenergized to select the fourth wafer 200*d* of switch 200. At the commencement of the transmission of the first character of the second letter, relay V is energized and so remains until the end of the transmission of the four characters of the second letter. Consequently, during the transmission of the characters of the second letter the wafers of the second letter switch 202 are connected to the four contacts of relay B. The relays X, A, B and Y operate exactly as described above during the transmission of the four characters of the first letter, so that the dot and dash characters of the second selected letter are transmitted in proper sequence interspaced with the correct intervals of silence.

At the end of the transmission of the fourth character of the second letter relays X, A, B and Y are all deenergized and relay D becomes energized. Relay F remains deenergized and relay Z remains energized through the NO contact 2 of relay Z and the make-before-break NO contact 2 of relay D. Relay V becomes deenergized because relay D is energized and relay F is deenergized. Relay E remains energized if the switch 116 is in the three letter position because relay F is deenergized and relay Z is energized. If switch 116 is in the two letter position relay E becomes deenergized for the first time since both relays F and V are deenergized. If switch 116 is in the two letter position, deenergization of relay E terminates the operation of the entire station identification signal apparatus by deenergizing the index relay 176. When relay E is deenergized the apparatus will remain inoperative until the momentary start switch 100 is subsequently closed to initiate the next sequence of station identification letters.

If switch 116 is in the three letter position at the end of the transmission of the fourth character of the second letter, the energization of relay D routes the dash space voltage from conductor 208 to the silence phantastron control tube 184, and the silence and sound phantastrons and relays operate as previously described for the duration of the letter space at the termination of which the X relay is energized and the D relay deenergized. The deenergization of the D relay breaks the circuit to the Z relay, deenergizing the same. Energization of the X relay energizes the A relay by routing 28 v. D. C. through the NO contact 4 of relay B and NO contact 2 of relay Y. Consequently, at the beginning of the transmission of the first character of the third letter the relays X, A, B, Y, D, V, and E are in the same state as at the beginning of the transmission of the first character of the first letter. The state of relays F and Z are reversed in that they are now deenergized. Referring to Fig. 4, the combination of relay F deenergized and relay V deenergized connects the four wafers of the third selector switch 204 which represents the third selected letter to the four contacts of relay B. Relays B and Y are changed in state as previously described to successively scan the first, second, third and fourth wafers of switch 204 to connect the oscillator to the earphones to sound the characters of the third letter as previously described. At the end of the transmission of the third letter relays X and Y become deenergized as before described, relay D becomes energized and relay F becomes energized by routing 28 v. D. C. through the NO contact 3 of relay D and the NC contact 1 of relay Z. Relay E becomes deenergized since relay F is energized and relay Z is deenergized. All the relays are in the same state as prior to the initial closing of the momentary start switch 100, and the apparatus remains inoperative until the switch 100 is again closed to initiate the transmission of the station identification signals.

In the event the station identification signals include two letters only, switch 116 is in the two-letter position and at the end of the transmission of the second letter, relays F and V are deenergized, and the circuits to relays E and Z are broken, resulting in a deenergization of the same. Consequently, all relays are in the same state as before the initial closing of the momentary start switch 100, and the apparatus does not transmit station identification signals until the switch 100 is subsequently closed.

In the event any letter of the series of identification signals has less than four characters, the contact of the wafer 200*b*, 200*c*, or 200*d*, or of the corresponding wafers of switches 202 and 204, following the last character of the letter is grounded. For example, the "E" terminal of wafer 200*b* is grounded. When the relays connect the grounded contact to the grid of the index relay control tube 174, the tube is cut off and index relay 176 is deenergized. The circuits to relays A, B and Y are broken, and relay D is energized, as at the start of each letter. The energization of relay D connects the dash voltage from conductor 208 to the silence phantastron to give a letter space period. Energization of relay D also causes relays F and V to scan the wafers of the next letter. When the sound phantastron its connected to the first wafer of the next letter, the voltage therefrom re-energizes the index relay through tube 174.

Cam 102 is driven by a timing shaft of the complete radio aids system of which this invention is only a part so that the transmission of the station identification signals is synchronized with the transmission of other signals, visual or aural.

*Typical operation*

As an example of a representative call signal, to illustrate the operation of the system of the invention, the station identification BGM, for the Binghamton radio station, will be used. To set the system up for transmitting the station identification BGM, the selector switch 200 is turned to the position marked for the letter B, the selector switch 202 is set for the letter G, and the selector switch 204 is set for the letter M. Because the message BGM consists of three letters, the switch 116 is placed in its 3-letter position with its movable contactor connected to its contact 3.

Assuming that 28-volt and 300-volt power supplies have been connected to the previously unenergized system and that the momentary start switch 100 is open, relays D and F will be in their operated conditions respectively. Closing the switch 100 momentarily then is all that is necessary to put the system into automatic operation. The switch 100 will generally be closed at periodic intervals by the cam 102.

It will be noted that even before the closing of switch 100 the operation of relay F has completed a circuit for scanning purposes from contactor 200F of the first wafer 200A of selector switch 200 through contacts of operated relay F and released relays V, B, and Y to the plate of sound phantastron control tube 172 and grid of tube 174. This circuit extends also in the reverse direction through the B contact of wafer 200A to conductor 208, which carries the voltage representative of a dash, the dash being the first character of the letter B, which letter is dash-dot-dot-dot in the Morse code. Tube 174 is made conducting by dot or dash voltage on its grid and operates Index Relay 176.

The closing of switch 100, energizes the relay E which in turn activates the bi-stable switching system controlling sound relay 112 and silence relay 106. The cycle performed by these two relays starts with the release of relay 106 and the operation of relay 112. Relay 112 operating causes the operation of relay X which connects the oscillator to the earphones 50, starting a dash signal. Relay 106, by releasing, starts a voltage run-down of the plate voltage of pentode 108, which continues until the plate voltage is reduced to a value equal to the voltage impressed upon the plate of the tube 172 by the conductor 208, representative of a dash signal. Meanwhile, the operation of relay X has caused relay D to release, in turn operating relay Z. The operation of relay X has also caused relay A to operate.

When the voltage run-down of pentode 108 has been completed, sound relay 112 is released and silence relay 106 is operated. Release of relay 112 is accompanied, as always, by release of relay X, thereby disconnecting the oscillator from the earphones and ending the dash signal. Release of relay 112 also starts a voltage run-down of the plate voltage of pentode 114. The plate of pentode 114 is directly connected to the cathode of tube 184, the plate of which is connected to the dot conductor 206 if relay D is released or to the dash conductor 208 if relay D is operated. During the space between two characters of the same letter, relay D is released so that the space is given the length of a dot signal, the run-down of the plate voltage of the pentode 114 being stopped by the diode 184 when the pentode plate voltage has been reduced to a value equal to the voltage impressed upon the plate of the diode by the dot conductor 206. It will be noted relay X in releasing has caused relay B to operate.

At the end of the run-down of pentode 114, relay 106 is released and relay 112 is operated, thereby operating relay X and reconnecting the oscillator to the headphones. The release of relay 106 starts a new voltage run-down of tube 108 which is limited by the plate voltage of diode 172, which is now connected through released relay Y, recently-operated relay B, released relay V, operated relay F, and wafer 200B to dot conductor 206. The result is the transmission of the first of the three dots in the letter B. It will be noted that relay X in operating has released relay A.

The relay connections are such that each time the bistable system of relays 106 and 112 changes state, the relay X is either operated or released. At the end of the dot signal just described, the X relay is released, causing relay Y to operate, in readiness for the next character as will be seen in what follows.

The release of relay X initiates a space, the duration of which is regulated to the length of a dot, since relay D is still released. The next operation of the relay X starts the next signal, the second dot in the letter B, since now, with relay Y operated, relay B operated, relay V released, and relay F operated, the scanning circuit is connected through to wafer 200C, representing the third character of the first letter of the station identification, which wafer is, of course, connected as are all the wafers of switch 200, for the letter B. This operation of relay X causes relay A to operate. The next releasing of the relay X causes relay B to release in readiness for the fourth character of the first letter, and initiates another dot-length space.

The next operation of the relay X initiates the third dot of the letter B, the scanning circuit now being by way of the operated relay Y, released relay B, released relay V, and operated relay F. Relay X in operating releases relay A.

At the end of this dot, the final character of the first letter, a new condition exists. Relays A and B are now released, so that as soon as X releases, relay D operates, transferring the plate of diode 184 from the dot conductor 206 to the dash conductor 208 and providing that the space between the first letter of the station identification and the second letter thereof shall be of dash length in time. Operation of relay D also results at this time in the operation of relay V and the release of relay Y in preparation for scanning the second letter of the station identification. The ensuing operation of relay X immediately releases relay D, and the release of relay D coupled with the operation of relay V breaks the holding circuit of relay F, releasing the latter relay in preparation for use later in scanning the third letter of the station identification. This operation of relay X also results in the operation of relay A.

At this point the system is ready to scan the first character of the second letter, which character is the first dash in the Morse code for the letter G, this letter having the code representation of dash-dash-dot. The scanning circuit is by way of released relay Y, released relay B, and operated relay V. The system thereupon transmits a dash. The relay X releases, and as relay D is now released, a dot-length space is made. At this time also, relay B is operated. The scanning circuit is now set up by way of released relay Y, operated relay B, and operated relay V to wafer 202B and thence to the dash conductor 208, whereby the second dash in the letter G is transmitted when relay X next operates, whereupon relay A is released. When relay X again releases, another dot-length space is produced, and relay Y is operated.

The scanning circuit now goes through relays Y, B, and V, all of which are now operated, and wafer 202C to dot conductor 206. Operation of relay X now results in the transmission of the dot at the end of the letter G and relay A is again operated. When relay X releases after the dot signal, relay B releases.

Since the letter G consists of less than four characters, the normal scanning pattern must be interrupted. The scanning path appropriate to the fourth character of the second letter of the station identification has just been set up in the regular way, through operated relay Y, released relay B, operated relay V, and wafer 202D, but the contact for the letter G position on wafer 202D is grounded. Ground potential is applied not only to the plate of diode 172 (instead of either dot voltage or dash voltage), but also to the grid of triode 174, cutting off that tube and releasing the Index Relay 176, thereby immediately releasing relays A, and Y. As relay B is already released, it is not affected in this example, but the release of relay 176 assures that relays A, B, and Y are all released. This action begins at the start of the space which follows the final dot in the letter G. Relay X releasing, causes relay D to operate, as relays A, B, and X are then all released. The operation of relay D places the dash voltage on the plate of diode 184, causing a dash-length space to be made. Relays D and Z now both being in operated condition, relay V is released. The relays are all now in the proper condition to scan the third letter, having omitted the scanning operation for the unused fourth character of the second letter. When relay X operates, relay D is released and relay A is operated. Relays B and Y still being released, the scanning path is now through these relays and through released relays V and F to wafer 204A and the dash conductor 208, thereby sending the first dash of the letter M whose code is dash-dash. When relay X releases, a dot-length space is made in regular manner as previously described. Also, relay B is operated. The scanning path now leads by way of released relay Y, operated relay B, released relay V, and released relay F to wafer 204B and the dash conductor 208, so that when relay X operates, the final dash in the letter is transmitted. Operation of relay X also releases relay A at this point. At the next release of relay X, relay Y is operated, completing a scanning path through relay Y, operated relay B and released relays V and F to wafer 204C, which has ground on the M contact. Relay 176 releases, releasing relays Y and B. As relay A is already released, relay D now operates, and, since relay Z is still released, relay F operates. But, since now relay F is operated and relay Z is released, relay E releases, de-energizing the bi-stable system. The system is now in condition to begin a repetition of the cycle which has been described, at the next closing of the switch 100.

Numerous changes may be made in the disclosed preferred embodiment of my invention without departing from the substance thereof as covered by the following claims:

We claim:

1. A universal station identification keyer for use in grounded navigation training equipment comprising, in combination, a selector switch having four wafers or the like representing the first, second, third and fourth characters of Morse code letters, each of said wafers having a separate contact for each letter of the alphabet having a Morse code character represented by the wafer, each of said contacts being connected to dot or dash regulating means according to whether the Morse code character represented by the contact is a dot or a dash, a control for selecting the contacts of the wafers according to the Morse code pattern of any letter of the alphabet, a signal emitter, keying means for activating the signal emitter, a plurality of sequentially operable relays for scanning the selected contacts of the respective wafers to control the activated periods of the emitter by said dot or dash regulating means in accordance with the potentials on the selected contacts of the wafers, and a bi-stable switching means responsive to said regulating means for activating the scanning relays and alternately therewith disabling the keying means to provide spaces between characters.

2. A universal station identification keyer for use in grounded navigation training equipment comprising, in combination, a pair of selector switches each having four wafers, or the like, said wafers representing the first, second, third and fourth characters of Morse code letters, each of said wafers having a separate contact for each letter of the alphabet having a Morse code character represented by the wafer, each of said contacts being connected to apply different voltages to dot or dash regulating means according to whether the Morse code character represented by the contact is a dot or a dash, a control for selecting the contacts of the wafers according to the Morse code pattern of any letters of the alphabet, a signal emitter keying means for said emitter, scanning means for controlling said keying means in accordance with the voltages applied to said wafer contacts, a first set of relays for selectively connecting the selector switches to said scanning means, a second set of relays for selectively connecting the wafers of each switch to the said scanning means, and means dependent upon the setting of the selector switches to control the time duration of the characters of the selected letter.

3. A universal station identification keyer for use in grounded navigation training equipment comprising, in combination, a selector switch having four wafers or the like representing the first, second, third and fourth characters of Morse code letters, each of said wafers having a separate contact for each letter of the alphabet having a Morse code character represented by the wafer, each of said contacts being connected to a particular voltage to dot or dash regulating means according to whether the Morse code character represented by the contact is a dot or a dash, a control for selecting the contacts of the wafers according to the Morse code pattern of any letter of the alphabet, a signal emitter, relay means for successively controlling the operation of said emitter by said dot or dash regulating means through the selected contacts of the wafers, and further relay means for regulating the dot and dash regulating means according to the contacts of said wafers selected by said control.

4. A universal station identification keyer for use in grounded navigation training equipment comprising, in combination, a plurality of selector switches each having four wafers or the like, representing the first, second, third and fourth characters of Morse code letters, each of said wafers having a separate contact for each letter of the alphabet having a Morse code character represented by the wafer, each of said contacts being connected to dot or dash regulating means according to whether the Morse code character represented by the contact is a dot or a dash, a control for each selector switch for selecting the contacts of the wafers of that switch according to the Morse code pattern of any letter of the alphabet, a signal emitter, means for successively controlling the operation of said emitter by said dot or dash regulating means through the selected contacts of said selector switches, means for controlling the operation of the signal emitter by said dot regulating means after the controlling thereby by the contacts of the first three wafers of the first of said selector switches, and means for controlling the operation of the signal emitter by said dash regulating means after the controlling thereby by the contacts of the fourth wafer of the first of said selector switches.

5. In a station identification keyer for use in automatically transmitting station designation call letters in code at predetermined intervals, settable means adapted to be adjusted by an operator for selecting any desired combination of designation characters, circuit means for translating selected characters into a predetermined code, signal generating means, a plurality of sequentially operable relays for scanning said circuit means for said code characters for each letter, a signal transmitting circuit, and keying means for alternately closing and opening the signal transmitting circuit to transmit successive signals from said generating means corresponding to said selected character designations as translated into said predetermined code and scanned by said scanning relay means.

6. Automatic repetitive signal transmitting means comprising a selective program control settable in accordance with the characters of a message to be transmitted, connecting conductor means for translating the characters of said selected message into a predetermined code, a signal generator, a plurality of sequentially operable relays for successively scanning said conductor means to transmit a series of signals corresponding to said coded message, and means for recycling the operation of said plurality of relays to automatically repeat transmission of said successive signals at predetermined intervals.

7. In a universal station identification keyer including a signal emitter and means for controlling the operation of said emitter to transmit successive signals representing discrete characters of a preselected code, the combination comprising a plurality of multi-contact selector switches, each of said switches having a plurality of contact elements and the contacts of each said switch being arranged in groups, each group of elements representing dot or dash signal components of characters in said code, a separate element of each group corresponding to each character of said code, relay switching means selectively connecting each of said elements individually to signal duration regulating means to regulate the signal duration according to whether the character component represented by the element is a dot or dash, and controls for selectively operating said switches to engage selected elements of each group corresponding to successive characters of a station identification call signal.

8. A universal station identification keyer for automatically transmitting station identification call signals in Morse code comprising a plurality of multi-contact selector switches, each of said switches having a plurality of contact elements arranged in separate groups, each group of elements representing dot or dash signal components of characters in Morse code, a separate element of each group corresponding to each character represented in Morse code, means connecting each element to dot or dash regulating means according to whether the character component represented by the element is a dot or dash, a separate control for selectively operating each of said switches to engage selected elements of each group corresponding to successive characters of any selected station identification call signal, a signal transmitting circuit including a continuous signal emitter, relay means for successively scanning the engaged contact elements of said selector switches to alternately close and open said transmitting circuit at timed intervals corresponding to the successive dot or dash representations of said selected characters in Morse code, and further means for recycling said relay means automatically to repeat transmission of said successive signals at predetermined intervals.

9. A universal station identification keyer for automatically translating any selected group of station call letters into a predetermined signal code, comprising in combination, a plurality of multi-contact selector switches each having a number of discreet groups of electrical contacts corresponding to the number of characters in a station call to be translated, each of said discreet groups containing a number of separate electrical contacts corresponding to the number of alphabet characters represented in said code, conductor means connecting each of said separate contacts to dot or dash regulating means according to whether the code character represented by the contact is a dot or a dash, a single unitary control for engaging a selected contact in each of said discreet groups according to the code pattern of any selected letter, relay means for scanning said selected contacts, and further relay means controlled by said dot or dash regulating means for successively operating said scanning means whereby each character selected by said control is automatically translated into said signal code.

10. A universal station identification code keyer comprising in combination, a selector switch having a plurality of banks of electrical contacts, a separate electrical contact in each bank corresponding to each letter of the alphabet to be represented in code, a signal emitter, dot or dash signal regulating means, means connecting each of said electrical contacts to said dot or dash regulating means according to whether the code character represented by the contact is a dot or a dash, a single unitary control for selectively engaging corresponding contacts in each bank according to the code pattern of any selected letter in said alphabet, and relay means for successively controlling the operation of said signal emitter by said dot or dash regulating means through the selected contacts of said switch.

11. An automatic signal keyer comprising in combination, an adjustable program control settable to the letters of a message to be transmitted, a start switch operable to initiate transmission of any selected message, connecting means adjustable by said switch to translate each selected letter into connections representative of corresponding characters of a predetermined code, relay means to successively scan said connections for the code characters for a selected letter, and further relay means operable to connect said scanning means to successive letter designations as selected by said program control.

12. Automatic code keying apparatus comprising an oscillator, a plurality of selector switches, means on each of said selector switches for deriving a voltage commensurate in amplitude with the sound duration of a desired call letter, means for combining the voltages to produce a second voltage commensurate in amplitude with the sound duration of all selected call letters, means for dividing said second voltage into dot and dash voltages commensurate with the time duration of a dot and a dash code signal, means on each of said selector switches for applying said dot and dash voltages to conductors in accordance with the characters included in each selected call letter, scanning means operable to connect sequentially the conductors to pulse generating means, said pulse generating means being operable to provide an output pulse having a time duration commensurate with the amplitude of the voltage on the conductor being scanned, and gating means responsive to said output pulse for connecting said oscillator to an output circuit.

13. Automatic code keying apparatus comprising an oscillator, a plurality of selector switches, reference voltage means for deriving dot and dash voltages having amplitudes commensurate with the sound duration of dot and dash characters, means on said selector switches for applying said dot and dash voltages to conductors in accordance with the characters included in each selected call letter, scanning means operable to connect sequentially in the conductors to pulse generating means, said pulse generating means being operable to provide an output pulse having a time duration commensurate with the amplitude of the voltage on the conductor being scanned, and gating means responsive to said output pulse for connecting said oscillator to an output circuit.

14. Automatic code keying apparatus comprising an oscillator, a plurality of selector switches positionable in accordance with desired call letters for applying signal voltages commensurate in amplitude with the sound duration of the characters of said desired call letters and an indexing potential indicative of the end of a desired call letter individually to a plurality of conductors in accordance with the characters included in the selected call letters, scanning means operable to connect said conductors sequentially to pulse generating means, said pulse generating means being operable to produce output pulses having a time duration commensurate with said signal voltages, and means responsive to said indexing potential for varying the sequence of said scanning means.

15. Automatic code keying apparatus comprising an oscillator, a plurality of selector switches positionable in accordance with desired call letters for applying voltages commensurate in amplitude with the sound duration of the characters of said desired call letters to a plurality of conductors, relay scanning means operable upon receipt of an input pulse for connecting said conductors sequentially to a coincidence circuit, integrating means operable to produce a voltage changing linearly with respect to time to said coincidence circuit, and bi-stable switching means responsive to the output of said coincidence circuit, said bi-stable switching means being operable to connect said oscillator to an output circuit as said integrating means operates and operable to disconnect said oscillator from said output circuit as the output from said integrator equals the voltage on the conductor being scanned.

16. Automaic code keying apparatus comprising an oscillator, a plurality of selector switches, each of said switches being positionable in accordance with a desired call letter for applying sound duration voltages and an indexing potential to a group of conductors in accordance with the characters of the selected call letter, scanning means operable to connect the conductors of each group sequentially to pulse generating means, said pulse generating means comprising means for generating pulses having a time duration commensurate with the sound duration voltage being scanned, and switching means responsive to said indexing potential for transferring the scanning means from the conductors of one selector switch to the conductors of another selector switch.

17. Automatic code keying apparatus comprising a signal emitter, a plurality of selector switches settable to positions representative of selected letters, a voltage source, circuit means connecting said voltage source to said selector switches to provide a plurality of conductors having potentials commensurate with the time duration of the characters of said selected letters, means for scanning said conductors to apply said potentials to a pulse generating means, and means responsive to said pulse generating means to cause said signal emitter to provide output signals.

18. Automatic code keying apparatus comprising a signal emitter, gating means operable to apply and disconnect signals from said signal emitter to and from an output circuit, a selector switch settable to positions representative of groups of code characters, a voltage source, circuit means connecting said voltage source to said selector switch to provide a plurality of conductors having potentials commensurate with the time duration of said code characters, means for scanning said conductors to apply said potentials sequentially to pulse generating means, said pulse generating means being operable to actuate said gating means to apply said signals from said signal emitter to said output circuit for periods of time commensurate with said potentials.

19. Apparatus according to claim 18 having means for deriving a further potential commensurate with the time duration of spaces between said code characters, said means for scanning being controlled by said further potential.

20. Automatic code keying apparatus comprising, means for exciting a plurality of conductors with potentials commensurate with the time duration of a plurality of code characters, scanning means operable to scan said conductors to provide output signals having time durations in accordance with said potentials, means for providing a further potential commensurate with time spacing between successive of said characters, and means responsive to said further potential for controlling said scanning means.

21. Automatic signal keying apparatus comprising in combination a signal emitter, means for exciting a plurality of conductors with potentials commensurate with the time duration of a plurality of characters desired to be transmitted, means for scanning said conductors to apply said potentials to a pulse generating means, and means responsive to said pulse generating means to cause said signal emitter to provide signals at an output circuit.

22. Automatic signal keying apparatus comprising in combination a signal emitter, means for exciting a plurality of conductors each with one of a pair of potentials, one of said potentials having an amplitude commensurate with the time duration of a dash character and the other of said potentials having an amplitude commensurate with the time duration of a dot character, means for scanning said conductors to apply said potentials on said characters to a pulse generating means, said pulse generating means being operable to provide gating signals commensurate in time with said potentials, and means responsive to said gating signals to cause said signal emitter to provide signals at an output circuit.

23. A universal station identification keyer for use in grounded navigation training equipment comprising, in combination, a plurality of selector switches each having four wafers or the like representing the first, second, third and fourth characters of Morse code letters, each of said wafers having a separate contact for each letter of the alphabet having a Morse code character represented by the wafer, each of said contacts being connected to apply different voltages to dot or dash regulating means according to whether the Morse code character represented by the contact is a dot or a dash, a control for each selector switch for selecting the contacts of the wafers of that switch according to the Morse code pattern of any letter of the alphabet, a signal emitter, keying means for activating the signal emitter, a plurality of sequentially operable relays for scanning the selected contacts of the respective wafers to control the activated periods of the emitter by said dot or dash regulating means through the selected contacts of the wafers, and means controlled by said dot or dash regulating means for controlling the time duration of spaces according as to whether the space is between letters or between characters in the same letter.

References Cited in the file of this patent

UNITED STATES PATENTS

| | | |
|---|---|---|
| 2,481,607 | McGoffin | Sept. 13, 1949 |
| 2,558,718 | Dougherty | July 3, 1951 |
| 2,622,145 | Kennedy | Dec. 16, 1952 |
| 2,660,720 | Dehmel | Nov. 24, 1953 |